US006006989A

United States Patent [19]

Ademmer et al.

[11] Patent Number: 6,006,989

[45] Date of Patent: Dec. 28, 1999

[54] AUTOMATIC MONEY-RECEIVING AND -DISPENSING MACHINE

[75] Inventors: Heinz Ademmer, Geseke; Udo Tewes, Paderborn; Peter Weigel, Borchen, all of Germany

[73] Assignee: Siemens Nixdorf, Paderborn, Germany

[21] Appl. No.: 09/043,958

[22] PCT Filed: Aug. 21, 1996

[86] PCT No.: PCT/DE96/01551

§ 371 Date: Mar. 27, 1998

§ 102(e) Date: Mar. 27, 1998

[87] PCT Pub. No.: WO97/13225

PCT Pub. Date: Apr. 10, 1997

[30] Foreign Application Priority Data

Sep. 29, 1995 [DE] Germany ............................ 195 36 481

[51] Int. Cl.[6] ...................................................... G06F 17/60

[52] U.S. Cl. .......................... 235/379; 235/475; 235/477; 235/481; 209/659; 209/534; 902/8; 902/12

[58] Field of Search .................................... 235/379, 380, 235/381, 475, 476, 477, 478, 480, 481, 485; 902/8, 9, 11, 12, 13, 14, 15; 209/569, 656, 657, 659, 534

[56] References Cited

U.S. PATENT DOCUMENTS

| | | | |
|---|---|---|---|
| 4,337,864 | 7/1982 | McLean | 209/534 |
| 4,465,193 | 8/1984 | Kokubo et al. | 235/379 X |
| 4,554,444 | 11/1985 | Hirose | 235/379 |
| 4,697,071 | 9/1987 | Hiraoka et al. | 235/379 |
| 4,866,254 | 9/1989 | Okayama et al. | 235/379 |
| 5,010,238 | 4/1991 | Kadono et al. | 235/379 |
| 5,021,639 | 6/1991 | Hara et al. | 235/379 |
| 5,186,334 | 2/1993 | Fukudome et al. | 235/379 X |
| 5,199,697 | 4/1993 | Yamada et al. | 902/12 X |
| 5,302,811 | 4/1994 | Fukatsu | 235/381 |
| 5,313,050 | 5/1994 | Hiroki et al. | 235/379 |

FOREIGN PATENT DOCUMENTS

| | | |
|---|---|---|
| 0 024 704 | 3/1981 | European Pat. Off. . |
| 0 148 310 | 7/1985 | European Pat. Off. . |
| 0 182 137 | 5/1986 | European Pat. Off. . |
| 0 211 813 | 2/1987 | European Pat. Off. . |
| 0 317 537 | 5/1989 | European Pat. Off. . |
| 0 409 809 | 1/1991 | European Pat. Off. . |
| 0517404A2 | 12/1992 | European Pat. Off. . |
| 30 42 566 | 8/1981 | Germany . |
| 91 16 582 U | 4/1993 | Germany . |
| 2285482 | 11/1990 | Japan . |
| 433088 | 2/1992 | Japan . |
| 6162315 | 6/1994 | Japan . |
| 96/26504 | 8/1996 | WIPO . |

*Primary Examiner*—Michael G Lee
*Attorney, Agent, or Firm*—Hill & Simpson

[57] ABSTRACT

In the case of an automatic money-receiving and -dispensing machine having a banknote-receiving location (20), having a banknote-checking and recognition device, having at least one intermediate store for intermediately storing received banknotes, having a banknote-dispensing location (22), having a plurality of storage units (30, 32, 34, 36) which are arranged in a secure housing (16) and are intended for keeping, storing and/or dispensing banknotes, and having transporting path (40) which connect the receiving location (44), the dispensing location (52), the checking and recognition device (58) and the storage units (30, 32, 34, 36) to one another, at least one of the storage units (32, 30) contains an exchangeable storage cassette (31, 33) for banknotes which are to be dispensed, at least one storage unit (34, 36) having a winding store for receiving, storing and dispensing banknotes, the storage units (30, 32, 34, 36) being connected to a common, first transporting path (40), which is arranged, together with the storage units (30, 32, 34, 36), in the secure housing (16), and the checking and recognition device, the intermediate store and a second transporting path, which connects the units to the receiving and dispensing locations (20, 22), being arranged in a top part (12) outside the housing (16) which accommodates the storage units (30, 32, 34, 36).

5 Claims, 2 Drawing Sheets

AUTOMATIC MONEY-RECEIVING AND -DISPENSING MACHINE

BACKGROUND OF THE INVENTION

1. Field of the Invention

The invention relates to an automatic money-receiving and -dispensing machine having a banknote-receiving location, having a banknote-checking and recognition device, having at least one intermediate storage for intermediately storing received banknotes, having a banknote-dispensing location, having a plurality of storage units which are arranged in a secure housing and are intended for keeping, storing and/or dispensing banknotes, and having transporting means which connect the receiving location, the dispensing location, the checking and recognition device and the storage units to one another.

2. Description of the Related Art

An automatic money-receiving and -dispensing machine of the abovementioned type is known, for example, from European Patent Document EP-B-24 704. In the case of these known automatic machines, the storage units contain storage cassettes from which banknotes can be transported to the dispensing location, via a first transporting section, and dispensed. Received banknotes run through an arrangement for checking authenticity and an arrangement for determining the nominal value and, provided the banknotes are authentic, are then deposited, in accordance with their nominal value, in an intermediate storage assigned to the respective storage cassette. From the intermediate storage, they may then be pushed into the cassette with the aid of a pushing device, with the result that they are available again for the purpose of being paid out. Also provided is a supply container, in which the banknotes which have been introduced can be stored irrespective of their nominal value and from which it is also possible for banknotes to be removed again. This storage container, with a relatively large capacity, can be emptied or reloaded as desired. Although, in the case of this automatic machine, it is possible for the availability of the machine to be increased and for the time which elapses before the storage cassettes have to be refilled or emptied again to be extended, this requires a relatively high degree of technical outlay.

A similar automatic machine is described in European Patent Document EP-B-148 310.

Furthermore, German Patent Document DE-A-30 42 566 discloses an automatic banking machine having a winding storage unit which makes it possible for banknotes which have been introduced to be stored one after the other.

SUMMARY OF THE INVENTION

An object of the invention is to provide an automatic banking machine of the type mentioned in the introduction which has a high storage capacity, and thus availability, is of a technically straightforward and clear construction and the capacity of which can be changed without a high degree of technical outlay.

This and other objects and advantages are achieved according to the invention in that at least one of the storage units contains an exchangeable storage cassette for banknotes which are to be dispensed, in that at least one storage unit has a winding storage unit for receiving, storing and dispensing banknotes, in that the storage units are connected to a common, first transporting path, which is arranged, together with the storage units, in the secure housing, and in that the checking and recognition device, the intermediate storage and a second transporting path, which connects the units to the receiving and dispensing locations, are arranged in a top part outside the secure housing which accommodates the storage units.

Received banknotes pass to the storage units, via the first transporting path, only when they have been checked for their authenticity and when it has been ensured that the transaction has been successfully completed. If, on the other hand, there is any factor which does not ensure successful completion of the transaction, the received banknotes can be quickly returned again to the customer without coming into any contact with the units accommodated in the secure housing. In the same way, structural changes to the head part, on the one hand, or to the storage units in the secure housing, on the other hand, do not in any way affect the respectively other unit. Using winding storage units makes it possible, without a high degree of technical outlay, for received banknotes to be dispensed again, with the result that the supply of banknotes in the storage cassettes is not used unnecessarily. As a result, the time between two reloading operations, and thus the availability of the automatic banking machine, is extended. The common transporting path for all the storage units easily permits further storage units to be connected and shortens the transaction times.

The outlay in terms of design and production for differently equipped automatic banknote-handling machines which are adapted to the requirements of the users can be improved by a modular configuration of the machine, in that the second transporting path is combined with the checking and recognition device and the intermediate storages to form a checking unit, the receiving location and the dispensing location, together with the a third transporting path which connects them, are combined to form a receiving/dispensing unit, and the three transporting paths can be alternately connected to one another via a switchable deflection location.

For received banknotes which have indeed been recognised as authentic but, on account of their nominal value for example, are not intended to be dispensed again, it is also possible for a collecting storage which is connected to the first transporting path to be provided in the secured housing.

The winding storage units are preferably connected directly, via a fourth transporting path, to a second receiving/dispensing unit, which is separate from the first receiving/dispensing unit. This second receiving/dispensing unit may be arranged, for example, on a side of the automatic banking machine which is only accessible to the bank employees, and it makes it possible for the winding storages to be fully unloaded and also reloaded with a certain supply of banknotes.

For quick intermediate storage of the received banknotes in the intermediate storage, and for quick dispensing of the same from the intermediate storage, it is expedient if the store is designed as a winding storage unit.

BRIEF DESCRIPTION OF THE DRAWINGS

Further features and advantages of the invention can be gathered from the following description, which explains the invention, with reference to an exemplary embodiment, in conjunction with the attached drawings, in which.

DETAILED DESCRIPTION OF THE PREFERRED EMBODIMENTS

Figure 1:
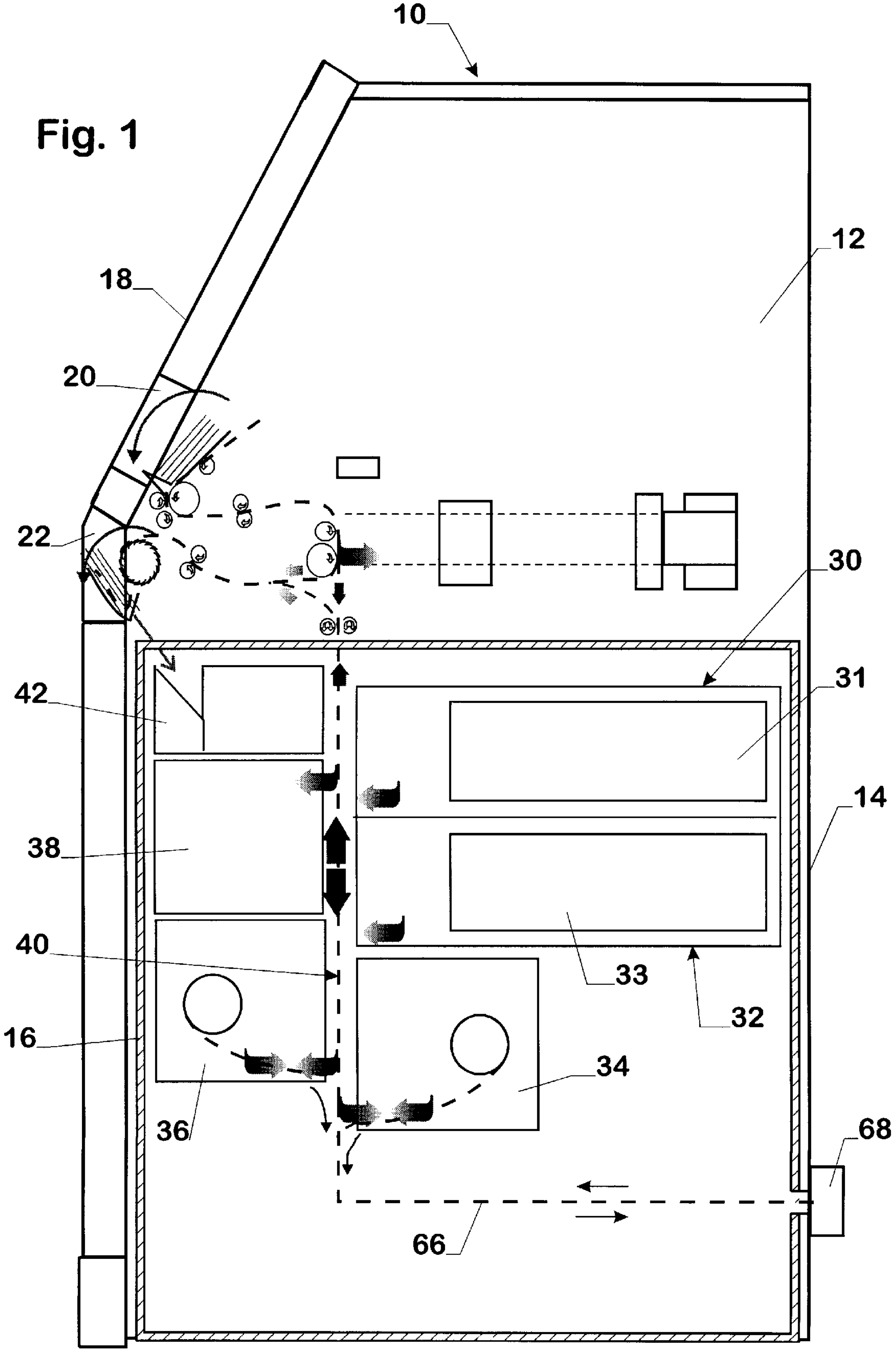
FIG. 1 shows a schematical vertical section through an automatic banking machine according to the invention.

The automatic banking machine illustrated in FIG. 1 comprises an outer housing 10 with a top part 12 and a base part 14, which encloses an inner secure housing or a safe 16. The top part 12 has a user interface 18 with an introduction opening 20 and a dispensing opening 22. Arranged within the top part, above the safe 16, are a receiving/dispensing unit 24, a verification unit 26 and a deflection unit 28, and these will be explained in more detail with reference to FIG. 2.

Provided in the safe 16 are two cassette-type storage units 30 and 32 which comprise storage cassettes 31 and 33, which can be exchanged in a manner that is known per se, and separating devices for removing stored banknotes. Also arranged in the safe are two winding storage units 34 and 36 which are known per se and serve the purpose of storing incoming banknotes and, if required, of dispensing these banknotes again in reverse order. Of course, the number of the cassette-type storage units and winding storage units may be selected as desired within the limits of the volume available. Provided in addition to the storage units described above is a collecting storage 38 for banknotes which have been received and found to be authentic but, for certain reasons, are not intended to be paid out again. The storage unit 30 to 38 are connected to a first, vertical transporting path 40 which is common to all the storage units, can convey banknotes in both directions and is connected to the respective storage unit via suitable diverters.

Finally, above the collecting storage 38, there is also provided a receiving container 42 which is intended for rejected and withdrawn banknotes and is connected to the dispensing location.

Figure 2:
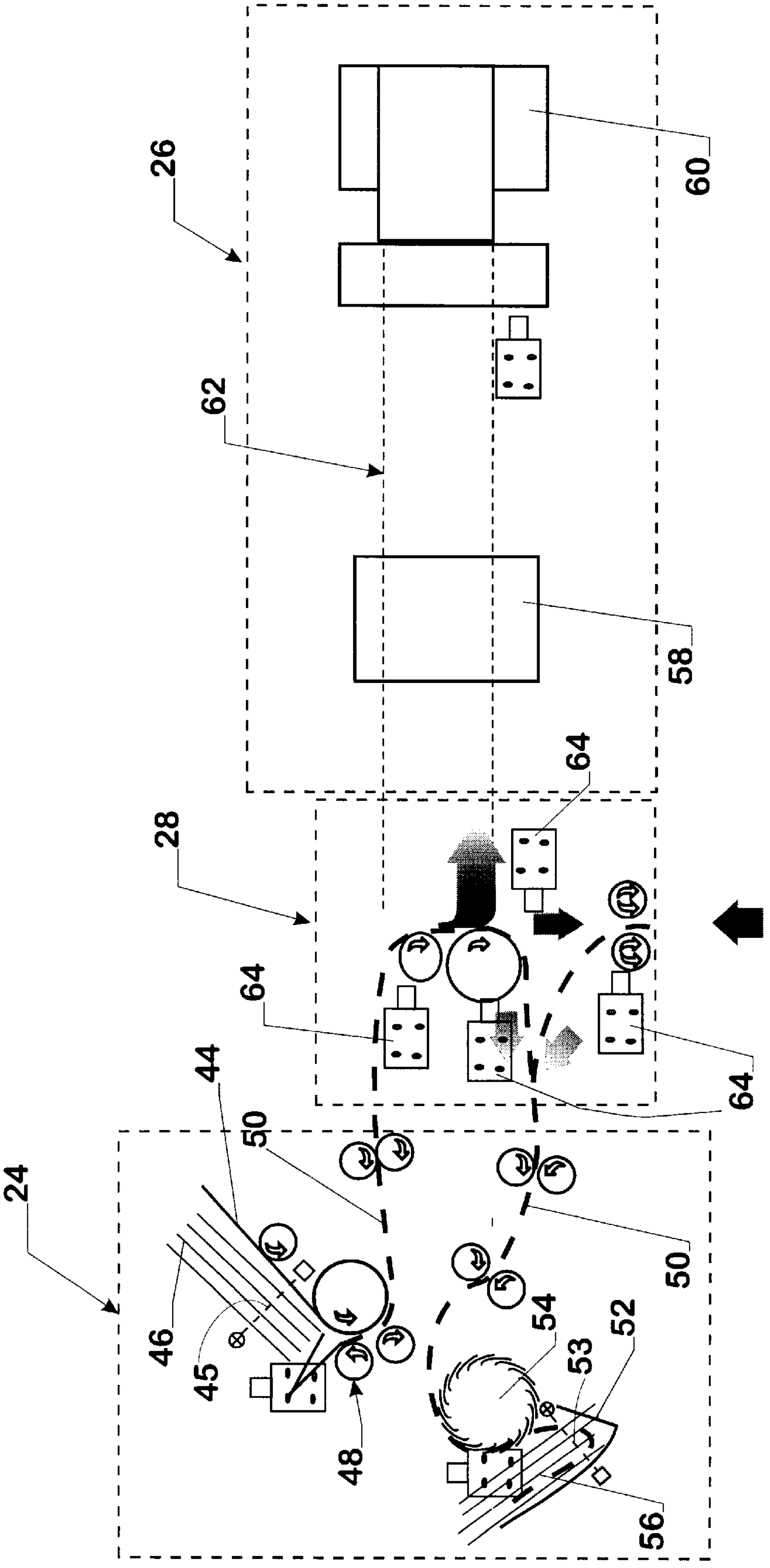
FIG. 2 shows an enlarged illustration of the receiving/dispensing unit and checking unit arranged in the top part of the automatic banking machine.

As shown in FIG. 2, the receiving/dispensing unit 24 comprises a receiving location having an introduction compartment 44 into which the customer can introduce a bundle of banknotes 46, and having a separating device 48 which separates the banknotes which have been introduced and feeds them to a transporting path 50 of the receiving/dispensing unit. The unit 24 also comprises a dispensing location having a dispensing compartment 52 in which banknotes which are to be dispensed via a stream-feed wheel 54 are collected to form a bundle 56, the banknotes being fed via a second arm of the transporting path 50. A series of light barriers 45 and 53 monitors, within the receiving/dispensing unit 24, the presence of the banknotes in the introduction compartment 44 and/or the dispensing compartment 52, the separating of the banknotes and the progression of the notes via the transporting path 50.

The testing unit 26 comprises an authenticity-testing arrangement 58 and an intermediate storage 60 designed as a winding storage unit. A winding storage unit is constructed, for example, as shown in U.S. Pat. No. 4,337,864 which is incorporated herein by reference. The banknotes that are introduced by a customer are checked for authenticity in the checking arrangement 58 and are intermediately stored in the intermediate storage 60 until all the banknotes of the bundle have been checked. The banknotes are then dispensed again via a third transporting path 62, which connects the checking arrangement to the intermediate storage 60 and belongs to the checking unit 26.

The transporting path 40, which leads into, and out of, the safe 16, the transporting path 50 of the receiving/dispensing unit 24, and the transporting path 62 of the checking unit 26 are functionally connected to one another by a deflection unit 28. By way of diverters (not illustrated) which are switched via solenoids 64, the deflection unit 28 connects the individual transporting paths to one another such that the banknotes are deflected, depending on appropriate control signals, in the directions designated by the arrows. As a result, banknotes which have been introduced into the opening 20 are either fed to the verification unit 26 or, in the case of a shortcoming which has been established beforehand, are led back directly to the dispensing location. From the verification unit 26, checked banknotes are either routed to the transporting path 40, and thus to the safe 16, or likewise fed to the dispensing location. Banknotes which are removed from the safe are routed directly to the dispensing location.

In a preferred embodiment of the invention, the winding storage units 34 and 36 within the safe are also connected, via a fourth transporting path 66, to a further dispensing compartment 68, which is located on the rear surface of the housing 10 and is only accessible to employees of the bank. Via this further receiving/dispensing unit 68, it is possible for the winding stores to be loaded or unloaded as required, in order to render them capable again of receiving banknotes which are to be introduced.

The receiving/dispensing unit 68 may also be located within reach of a teller. In this case, it is expedient for the fourth transporting path 66 also to be fed with banknotes from the storage units 30, 32.

Although other modifications and changes may be suggested by those skilled in the art, it is the intention of the inventors to embody within the patent warranted hereon all changes and modifications as reasonably and properly come within the scope of their contribution to the art.

We claim:

1. An automatic money-receiving and -dispensing machine, comprising:

- a banknote-receiving location at which banknotes are received,
- a banknote-checking and -recognition device,
- at least one intermediate storage for intermediately storing banknotes received at said banknote-receiving location,
- a banknote-dispensing location,
- a secure housing within said automatic money-receiving and -dispensing machine,
- a top part of said automatic money-receiving and -dispensing machine outside of said secure housing,
- a plurality of storage units arranged in said secure housing for storing banknotes,
- transporting paths which connect the banknote-receiving location, the banknote-dispensing location, the checking and recognition device and the storage units to one another,
- at least one of the storage units being an exchangeable storage cassette for banknotes which are to be dispensed,
- at least one of said storage units being a winding storage unit for receiving, storing and dispensing banknotes,
- said transport paths including:
  - a first transporting path connecting said storage units to one another, said first transport path being in the secure housing, and
  - a second transporting path connecting the checking and recognition device, the intermediate storage to the receiving and dispensing locations, said second transporting path being in said top part.

2. The automatic money-receiving and -dispensing machine as claimed in claim 1, further comprising:

a third transporting path connected between said banknote-receiving location and said banknote-dispensing location, and the second transporting path, the checking and recognition device and the intermediate storage are combined to form a checking unit, the banknote-receiving location and the banknote-dispensing location, together with the third transporting path are combined to form a receiving/dispensing unit, and a switchable deflection location alternately connecting said first, second and third transporting paths to one another.

3. The automatic money-receiving and -dispensing machine as claimed in claim 2, further comprising:

a second receiving/dispensing unit which is separate from said first receiving/dispensing unit, a fourth transporting path connecting at least the winding storage units directly to said second receiving/dispensing unit.

4. The automatic money-receiving and -dispensing machine as claimed in claim 1, further comprising:

a collecting storage unit connected to the first transporting path and arranged in the secured housing for storing banknotes which are received but which are not to be dispensed from said banknote-dispensing location.

5. The automatic money-receiving and -dispensing machine as claimed in claim 1, wherein the intermediate store is a winding storage unit.

* * * * *